United States Patent [19]
Hayner et al.

[11] Patent Number: 5,094,889
[45] Date of Patent: Mar. 10, 1992

[54] WATER BASED COATING FOR ROUGHENED METAL SURFACES

[75] Inventors: Roger E. Hayner, Flatwoods, Ky.; Stephen E. See, Wheelersburg, Ohio

[73] Assignee: Ashland Oil, Inc., Ashland, Ky.

[21] Appl. No.: 594,590

[22] Filed: Oct. 9, 1990

Related U.S. Application Data

[62] Division of Ser. No. 350,076, May 10, 1989.

[51] Int. Cl.$^5$ ............................ B05D 3/00; B05D 3/12
[52] U.S. Cl. .................................. 427/327; 427/388.4; 422/13; 428/457
[58] Field of Search ............... 422/13; 427/327, 388.4; 418/457

[56] References Cited

U.S. PATENT DOCUMENTS

| | | | |
|---|---|---|---|
| 4,143,205 | 3/1979 | Rowe et al. | 428/469 |
| 4,161,566 | 7/1979 | Higgins | 106/14.12 X |
| 4,338,141 | 7/1982 | Sinzaki et al. | 427/327 X |
| 4,629,753 | 12/1986 | Quinn | 427/388.4 |
| 4,728,578 | 3/1988 | Higgins et al. | 427/388.4 X |

FOREIGN PATENT DOCUMENTS 0229349 12/1986 European Pat. Off. .

OTHER PUBLICATIONS

Lubrizol Corp., "Lubrizol 2064", Diversified Products Group, Plastics & Paints—Data, 8/85.
Lubrizol Corp., "Lubrizol 2064", Diversified Products Group, Plastics & Paints—Applications.
Lubrizol Corp., "Experimental Products", Diversified Products Group.
Johnson Wax, Specialty Chemicals, "Jon—Cote 639 Temporary Protective Coating", Adv. 0-306, 1982.
Witco, Material Safety Data Sheet—SACI 445-W, 4/27/83.
Witco, "SACI-450W Base & SACI-445W", No. 18411.
Lubrizol Corp., "Lubrizol 5363", Diversified Products Group, Application Chemicals—Data.
Lubrizol Corp., "Material Safety Data Sheet—Lubrizol 2064", 4/15/86.
Lexington Coating Technology, Inc., "Product Information—Nitrocoat".
Witco Corp., "SACI Product Comp. & Formulating Review", Witco's SACI.
Union Camp Corp., "Chemicals Product Data", 'Unitol DSR-90', No. 288.
Lubrizol Corp., Lubrizol Chemicals, "Lubrizol 2064".
Polyvinyl Chemicals, Inc., "Neo Cryl Neo Rez Product Guide".
Lubrizol Corp., "Technical Report on OS69840 and OS64296, Temporary Protective Coating", Jun. 9, 1988.
Witco Corp., Product Data Sheets—RP-214, RP-215-A, RP-216-A (07/10/90), N.Y., N.Y.

Primary Examiner—Michael Lusignan
Attorney, Agent, or Firm—Richard C. Willson, Jr.

[57] ABSTRACT

Calcium or other sulfonate gel in an oil carrier (such as that of U.S. Pat. No. 4,629,753 to Quinn), optionally mixed with a small amount of sodium sulfonate and tall oil fatty acids, can be neutralized with amine, e.g. DMEA, to form a soap which can be dispersed in water. Adding an acrylic emulsion results in an acrylic coating rich in corrosion-retarding alkali metal or alkaline earth metal sulfonates. This finish on metalurgically roughened, e.g. nitrocarburized, metal forms a firm film which can resist greater than 500 hours ASTM B117 salt spray.

9 Claims, 2 Drawing Sheets

WATER BASED COATING FOR ROUGHENED METAL SURFACES

This application is a divisional application of U.S. Ser. No. 07/350,076 filed May 10, 1989.

CROSS REFERENCE TO RELATED APPLICATIONS

Applications 6277NUS, now U.S. Pat. No. 4,748,055; 6277PUS, U.S. Ser. No. 199,975; RI-6277QUS, U.S. Ser. No. 057,677; and RI-6277RUS, U.S. Ser. No. 243,957, cover siloxane compositions on roughened metals.

BACKGROUND OF INVENTION

The invention pertains to the field of corrosion protective coatings generally classified in U.S. Patent and Trademark Office class 427, subclasses 292, 409, 240, 421, 428, 429, and 435.

DESCRIPTION OF THE PRIOR ART

U.S. Pat. No. 2,528,535 to Merker teaches phosphating oil-in-water systems for lubricating compositions preferably with oxidation inhibitors and mentions the possibility of adding rust corrosion inhibitors, preferably less than 3% by weight.

U.S. Pat. No. 4,737,385 to Pekar (assigned Texo Corporation), teaches di-phase oil coatings which are applied to surfaces which have been conventionally phosphated to improve corrosion resistance. Components are siloxane compositions, water based siloxane compositions mixed with water-reducible epoxy-esters and then baked to produce the final coating.

U.S. Pat. No. 4,136,043 to Davis (assigned Lubrizol), oil-soluble dispersants with dimercaptothiadiazole, to suppress copper activity and "lead paint" deposition in lubricants.

U.S. Pat. No. 4,606,945 to Itoh (assigned Nissan), coatings to protect the surface of automobiles and other articles.

U.S. Pat. No. 4,629,753 to Quinn (assigned Lubrizol), uses water dispersed compositions comprising solid metal containing colloidal particles and liquid dispersing medium, and hydrophobic-polar organic molecules.

U.S. Pat. No. 4,113,693 to Blount (no assignee) and U.S. Pat. No. 4,011,253 to Blount (no assignee) use acrylic silicate compounds and resinous products, with anionic and cationic emulsifying agents as molding compositions.

The following U.S. patents teach preparation of sulfonates useful with the present invention: U.S. Pat. Nos. 3,242,079; 3,372,115; 3,746,643; 4,253,976; and 4,260,500.

None of the above patents disclose the water-based, air-dryable compositions of the present invention for use over metallurgically-prepared ("roughened") metallic surfaces to provide demonstrated high salt-spray resistance.

SUMMARY OF INVENTION

I. General Statement of the Invention:

According to the present invention, metallic work pieces are protected from corrosion, e.g. ASTM B117 salt spray tests, by the steps of:

(a) roughening the surfaces of the work pieces, e.g. by sand blasting, by nitrocarburizing, by oxynitriding, by nitrocarburizing plus oxidizing, by phosphating, or by other metallurgical processes which provide an expanded, porous surface having sufficient strength to retain a coating onto the metallic work piece surface; and (b) applying to said expanded surface a waterborne self-sealing corrosion protective coating composition capable of application to metallic surfaces; said composition comprising in combination:

1. A colloidal-bearing organic/inorganic complex having a total base number in the range of about 80 to about 400, e.g. calcium sulfonate gel such as Lubrizol 2064, and comprising solid metal-containing colloidal particles, liquid dispersing agent and an organic compound containing a hydrophobic portion and a polar substituent;
2. Optionally, an alkali metal or alkaline earth metal sulfonate having a total base number in the range of about 0.05 to about 200, e.g. a sodium petroleum sulfonate such as Lubrizol 5363;
3. A fatty acid having an acid range of about 80 to about 250, and saponification number in the range of about 80 to about 250, and having an iodine number in the range of about 100 to 160, e.g. a tall oil fatty acid such as Unitol DSR-90;
4. Water;
5. An acrylic emulsion;
6. An alkali substituted organic amine such as triethylamine or dimethylethanolamine;
7. Optional thickeners, pigments, fillers, dies, odorants, plasticizers, cosolvents, extreme pressures (EP) additives and other optional additives well known to those skilled in the art.

UTILITY OF THE INVENTION

This invention provides extreme corrosion protection of a level previously usually obtained only by expensive electroplate, e.g. cadmium or even chromium plating, at a small fraction of the cost of such plating. An attractive black surface can be provided to fit the prevailing fashion for black surfaces in the automotive industry.

DESCRIPTION OF THE PREFERRED EMBODIMENTS

Figure 1:
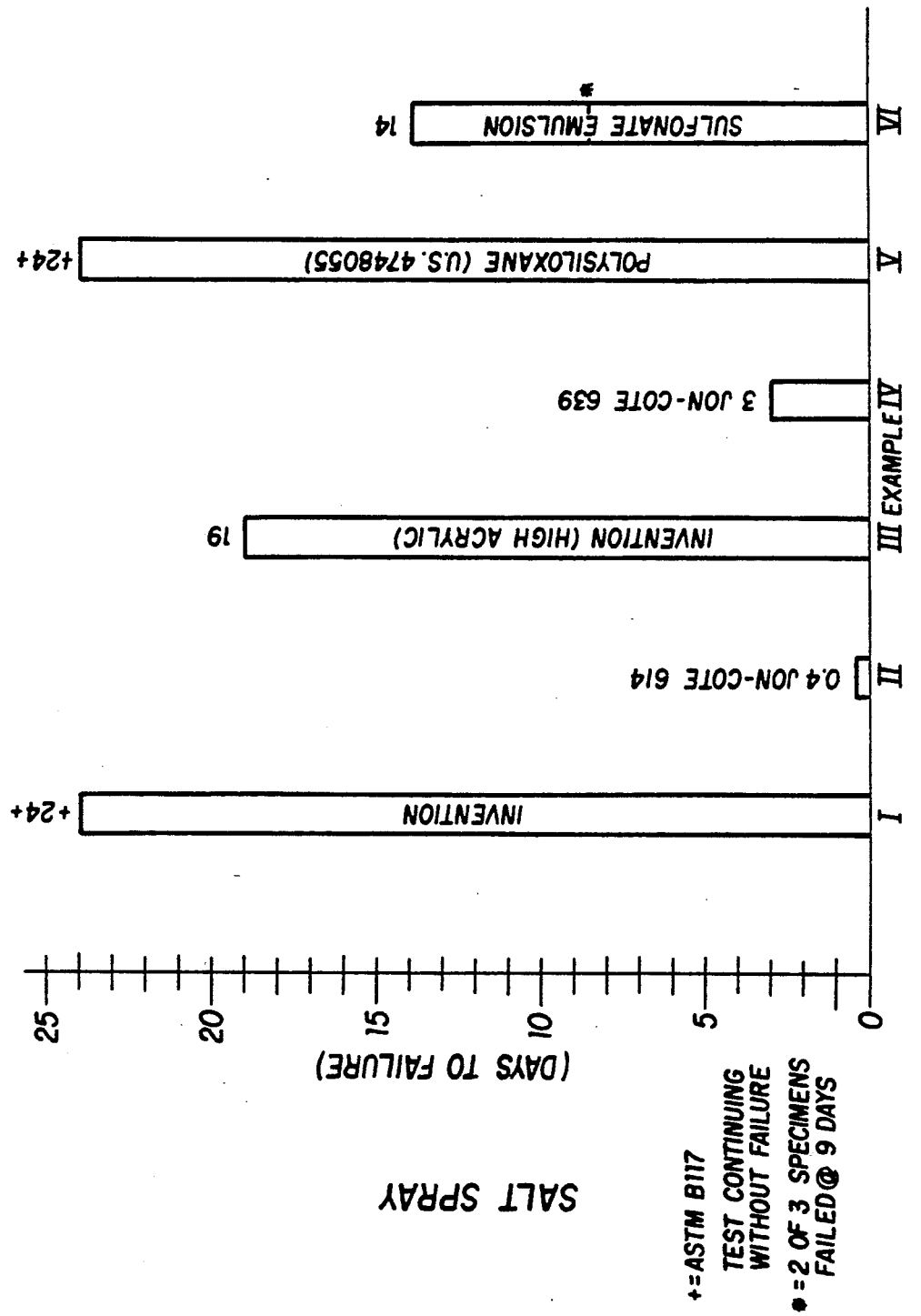
FIG. 1 is a graph of salt spray resistance (days to failure) for several inventive and conventional formulations.
Figure 2:
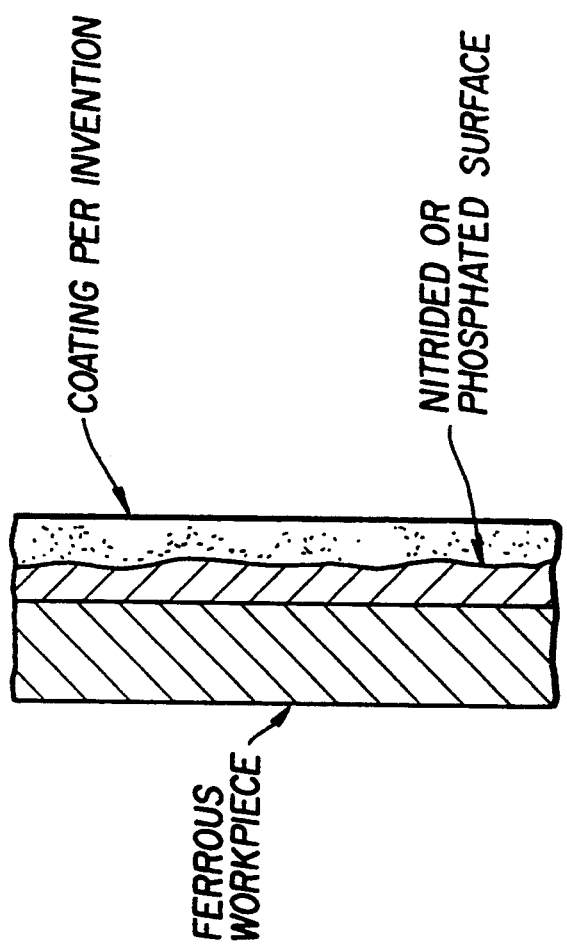
FIG. 2 is a schematic diagram of a manufacture according to the invention.
Figure 3:
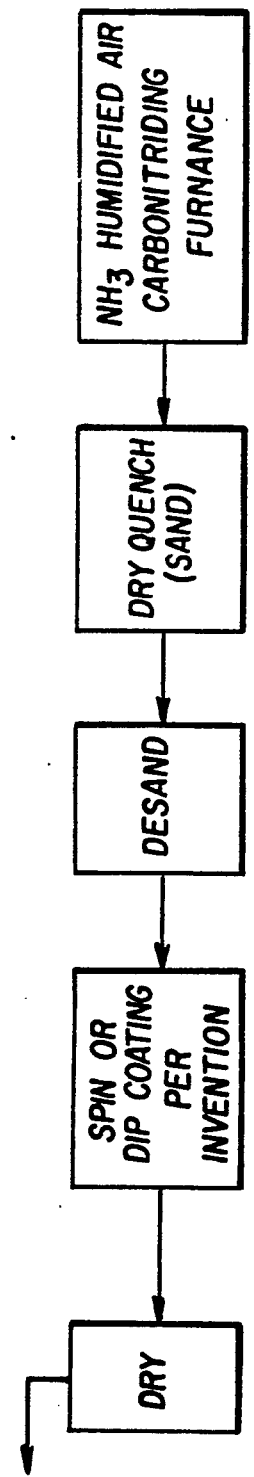
FIG. 3 is a schematic diagram of a process of the present invention showing nitrocarburizing followed by dip coating into the emulsion compositions of the invention.

1. Starting materials:

(a) metallurgically preparing the work piece surfaces;
Surface Treatment Processes Surface treatment processes can be conventional such as chromate, and particularly preferred nitriding or phosphating.

See generally Kirk and Othmer, "Encyclopedia of Chemical Technology", 2nd ed., vol. 18 (1969), pp. 282-303 and the later editions.

Phosphating can be accomplished by the conventional techniques such as those set forth in "Practical Phosphate Coatings", Mangill Company, and U.S. Pat. Nos. 3,967,948, 2,465,247, 3,686,031, 4,419,199, 4,539,051 and 4,540,637 and references thereto. For automotive uses, preferred phosphating is to a thickness of at least 2,000–3,000 mg zinc phosphate/square foot of work piece.

Nitriding can be either salt bath or fluidized bed nitriding, such as the commercial processes "Tuff Tride", "Melonite", "QPQ" (Quench-Polish-Quench, in which salt bath nitriding is followed by quench in an oxidizing salt bath, followed by mechanical polishing, and a second quench), or fluidized bed nitriding as described in "Fluidized Bed Furnace Heat Treating Applications for the Dye Casting Industry", JAPKA, May-June 1983, Dye Casting Engineer. Miscellaneous surface treatment processes which may be employed with the invention include Procedyne's "Dyna-Case Surface Hardening Treatment", deep case carburization in a fluidized furnace by adding methanol which is vaporized and mixed with nitrogen and a small amount of natural gas to form a synthetic endothermic atmosphere within the treating furnace at about 899°–1010° C. 1650°–1850° F.) for 1–8 hours, carbonitriding at 815°–871° C. (1500°–1600° F.) for 10 minutes–1 hours, followed by quenching; nitriding by adding nitrogen from raw ammonia onto the surface of the material at 510°–593° C. (950°–1100° F.) to provide a case of 0.001–0.015 inches deep; nitrocarburizing providing a case of 0.005–0.0020 inches deep by contacting mixtures of natural gas and raw ammonia in a fluid bed furnace at 566°–621° C. (1050°–1150° F.) for 0.5–2 hours; steam bluing in a fluid bed furnace at 343°–538° C. (650°–1000° F.) for 20 minutes–1 hour to provide a blue or black surface, or even combinations of these conventional surface treatment processes.

Carbonitriding is particularly preferred.

(b) application of the compositions of the invention;

Application: The formulations of the present invention may be applied to substrates to be protected by conventional application techniques, such as spraying, brushing, dipping, flow-coating, dipspinning, "Filwhirl", or airless spraying. Coating thickness can be varied by changing the formulation, the number of coats, or the amount applied per coat but in general will be in the range from about 0.1 to about 5 mils, more preferably 0.2 to 2 mils, after drying.

1. Organic/inorganic complex

The colloidal metal-bearing organic/inorganic non-Newtonian complex will preferably be produced according to the techniques of U.S. Pat. No. 4,629,753 to Quinn. The complex will preferably have a total base number in the range of about 80 to about 400, and preferably comprise solid metal-containing colloidal particles, dispersing agents, and at least one organic compound containing a hydrophobic portion in its molecule, and also one or a plurality of polar substituents in its molecule.

Preferably the complex is a non-asphaltic, non-mastic type of coating composition comprising an effective amount of water (preferably 0.1 to 10, more preferably 0.2 to 6, most preferably 0.3 to 3% water) and having dispersed within said water a non-Newtonian colloidal dispersed system comprising: a) solid metal containing particles of alkaline earth metal salts; (b) a dispersed medium comprising a liquid hydrocarbon fraction; and (c) at least one organic compound comprising alkaline earth metal salts of oil soluble organic acids, said dispersed system being characterized by having a neutralization base number of about 2.0 or less.

Preferably the dispersed system will include solid metal-containing particles of alkaline earth metal salts selected from the group consisting of: (a) calcium and barium carbonates; (b) a dispersed medium comprising mineral oil; and (c) at least one alkaline earth metal salt of oil-soluble organic acids selected from the group consisting of calcium and barium sulfonate and carboxylate.

Most preferred of the complexes is the complex sold by Lubrizol Corp. of Wickliffe, Ohio under the brand name "Lubrizol 2064".

About 2 to 50, more preferably 5 to 40, and most preferably 10 to 30 parts by weight of the complex will be used in the compositions of the invention.

Stated differently, the complex may be described as an overbased alkali or alkaline earth metal, e.g. calcium, sulfonate gel. The organic/inorganic complex will have a total base number ranging from about 100 to about 450, and more preferably from about 200 to 400.

2. Alkali or alkaline earth metal sulfonates. (Optional)

About 1 to 30, more preferably about 3 to 20, and most preferably about 4 to 10 parts by weight of a sodium sulfonate can be added. Such sulfonate will preferably have a total base number of about 0.5 to 200, more preferably about 1 to 100, most preferably 5 to 50. Preferred sulfonates are alkali metal sulfonates, more preferably sodium sulfonate, and most preferably Lubrizol 5363 from Lubrizol Corp., Wickliffe, Ohio.

3. Fatty acid

About 0.1 to 5.0, more preferred 0.2 to 3.0 and most preferred 0.5 to 2.0, parts by weight of a (preferably $C_5$–$C_{20}$, more preferably $C_8$–$C_{18}$) carboxylic acid or mixture thereof having an acid value ranging from 100 to 200, most preferred being 180 to 200, and a saponification number ranging from 100 to 200 with the most preferred also being 180 to 200. Iodine value for the material preferred is 130 to 140. Acids available from Union Camp, known as Unitol DSR-90, are particularly preferred.

4. Alkali substituted organic amines/ammonia

About 0.1 to 10.0, more preferred 0.2 to 5.0 and most preferred 0.2 to 2.0, parts by weight of an amine or combination of amines preferably selected from the group of triethylamine, triethanolamine, dimethyethanolamine, or 2-amino-2-methyl-1-propanol (Angus Chemical, Chicago, AMP-95) or monoethanolamine. Most preferred are combinations of triethylamine and dimethylethanolamine in ranges of 0.2 to 2.0 parts by weight. "Amine" as used herein includes aqua ammonia which can be used as a substitute for the organic amines.

5. Water

Water employed in the formulation is most preferred as deionized or distilled but is not critical as normal tap water may be employed. Water added should not be in excess of that which produces a dried film of the desired thickness.

6. Acrylic Emulsion

About 10 to 80, more preferred 20 to 70, and most preferred 25 to 65 parts of an acrylic emulsion of a water dispersed polymer capable of film forming. Said water dispersed polymer particles are an acrylic copolymer derived from the mixtures of two or more ethylenically unsaturated monomers or at least one ethylenically unsaturated monomer and at least one vinyl double bond unsaturated monomer. Preferred acrylic emulsion is Neocryl A-621 commercially available from ICI, formerly Polyvinyl Chemical. Others such as Neocryl A-620 and various others may be substituted to obtain desired properties.

7. Optional conventional ingredients may also be added, e.g. thickeners, additional corrosion inhibitors, pigments, fillers, dyes, odorants, plasticizers, co-solvents, extreme pressure (EP) additives, etc.

2. Concentrate Preparation

Apparatus: The apparatus for the present invention will be that conventionally utilized in the preparation of coatings compositions, e.g. kettles and mixing tanks having flow metering or measuring devices and agitation means, e.g. pumps mounted on side-arms connecting with the main vessel, internal stirrers, contra-rotating shearing devices and any of the other available devices which are well known to the art.

Temperature: The temperature during mixing may be different during different stages in the formulation. These temperatures are not narrowly critical and will vary to provide faster mixing or better compatibility of ingredients according to observation of those skilled in the art. For example, pressure vessels may be utilized for the purpose of raising ingredient boiling points, where useful, in order to provide better dispersion of difficult-to-mix ingredients.

Mixing Procedure: While the formulations of the present invention may be manufactured continuously if desired, batch techniques will be more usually employed. The sulfonate/acrylic emulsions are mixed thoroughly under constant agitation, after which the formulation is drawn off into shipping containers, e.g. tank cars, tank trucks, drums or smaller cans.

Quality Control: The finished formulation, prior to packaging, will generally be checked for viscosity, pH, freeze-thaw stability, corrosion-protection under accelerated conditions and other tests utilizing techniques well known to the coatings industry.

3. Emulsion Preparation

The concentrate (e.g. prepared according to Example 1) is diluted with 10 to 80, or more preferably 20 to 65, and most preferably 30 to 55 parts by weight of water to form the emulsion which is applied to the work pieces. The solution is preferably applied at 25° C. (77° F.).

4. Batch or Continuous Basis

While the examples describe the invention on a batch basis, it may come, of course, to be practiced on a continuous basis with continuous flows of starting materials into the mixing vessel and with continuous coating techniques, e.g. roller coating continuous conveyor or even continuous work piece, e.g. sheet steel moving continuously through a dip tank.

EXAMPLE 1

(Formulation according to the invention providing excellent salt spray resistance and shelf life.)

To a conventional steam jacketed mixing kettle equipped with rotary stirrer are added 23.48 parts by weight of calcium sulfonate gel having a base number of about 80 to 400 and purchased as Lubrizol 2064. To the sulfonate gel is added 6.26 parts by weight of sodium sulfonate, LZ5363 also purchased from Lubrizol Corp., Wickliffe, Ohio. Under mixing is added 0.62 parts by weight of amine in the form of triethylamine available from Union Carbide Corp., Danbury, Conn. Continuing mixing 0.94 parts by weight of fatty acid, preferably tall oil fatty acid purchased from Union Camp of Jacksonville, Fla., as Unitol DSR-90 and 0.5 parts by weight of 28° baume aqua ammonia as an additional fugitive neutralizing agent. Stirring continues during the addition of each ingredient to prepare a neutralized, amine fatty acid soap/sulfonate complex. The amine soap functions as an emulsifier package for emulsification of the sulfonate organic/inorganic complex. To this mixture 21.45 parts of water which preferably has been preheated to 130°–150° F. to facilitate emulsification is added while mixing is continued. Once the sulfonate complex is converted to the emulsion form, 46.75 parts of an acrylic emulsion known as Neocryl A-621, available from ICI (formerly Polyvinyl Chemical) is added. Heating is discontinued but stirring is continued about 60 minutes to ensure a homogeneous mixture. The contents of the mixing vessel are then sampled, quality control tested for viscosity, stability and appearance followed by the drawing off of the formulation into 55 gallon drums. (Additional water may be added separately to desired levels because the individual applications will require various non-volatile and viscosity levels to facilitate dipping, spraying, or brushing.)

The resulting formulation is tested for corrosion protection by applying it to a ferrous work piece which has been previously nitrocarburized conventional techniques, e.g. those of U.S. Pat. No. 4,496,401, Dawes, or U.S. Pat. No. 4,756,774 to Fox, by dipping the work piece into an emulsion formed by adding one part by volume of the above formulation with 1 parts by volume of demineralized water. After drying for 24 hours, the test work piece is subjected to a 5% neutral pH salt (NaCl) spray at a temperature of 35° C. (95° F.) according to ASTB-117. The test part resists failure (corrosion) for 24+ days (576+ hours).

A sample of emulsion (diluted as specified above) shows no significant separation (i.e., less than 2% "cream") upon standing at room temperature for 24 hours.

When a work piece as previously described is dipped into the above formulation (diluted) and allowed to dry at room temperature at approximately 50% relative humidity, the coating is dry to touch in 0.5 to 2 hours, but is cured for 24 hours. The coating remains self-healing, i.e., a scratch made with a scribe heals to protect the metal.

(For comparison, a similar but coated phosphated work piece fails in less than 48 hours and a similar but uncoated nitrided work piece fails in less than 72 hours of salt spray.)

EXAMPLES II TO VI (according to Table 1)

When various differing compositions are prepared according to Example 1 using ingredients according to Table 1, the results are as shown in Table 2.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. For example, the formulation may contain additional corrosion inhibitors biocides, antifoamers, dyes, pigments, antiwear additives, EP (extreme pressure) additives, perfume or odor masking agents, etc.

Reference to patents made in the specification is intended to result in such patents being expressly incorporated herein by reference including any patents or other literature references cited within such patents.

TABLE 1

(parts by wt.)

| Example Ingredient | I.<br>B1641-184 #2<br>Invention | II.<br>Joncryl<br>(acrylic)<br>Safety Film<br>Chemtrend 614<br>B-1646-200A<br>Comparative | III.<br>B1641-184 #1<br>Invention | IV.<br>Joncryl<br>Safety Film<br>Chemtrend 639<br>B1646-200D<br>Comparative | V.<br>Comm'l Form.*<br>Polysiloxane<br>B1646-199E<br>Comparative | VI.<br>Witco<br>SACI 445W<br>Sulfonate<br>Emulsion<br>B1646-192B<br>Comparative |
|---|---|---|---|---|---|---|
| Unitol DSR-90 | 0.94 | | | | | |
| TEA | 0.62 | | | | | |
| N,N-DMEA | | | 1.30 | | | |
| Aqua Ammonia | 0.50 | | | | | |
| Uniflex DBS | | | 3.30 | | | |
| Water | 74.65(1) | | 95.60(1) | | 80.00 | 80.00 |
| Lubrizol 2064 | 23.48 | | 14.60 | | | |
| Lubrizol 5363 | 6.26 | | | | | |
| Neocryl A-621 | 46.75 | | 68.40 | | | |
| SACI 445W | | | | | | 100.00 |
| Joncryl 614 | | 100.00 | | | | |
| Joncryl 639 | | | | 100.00 | | |
| Tectyl NitroCoat 801 | | | | | 20.00 | |
| (All Blends at 20%-25% Non-volatiles) Total Parts By Weight | 153.20 | 100.00 | 183.20 | 100.00 | 100.00 | 180.00 |

*according to U.S. Pat. No. 4,748,055 to Landers, Felton and Williams (docket 6277NUS)
(1)concentrate diluted with additional water

TABLE 2

(Days of ASTM B117 to failure)

| Example Ingredient | I.<br>B1641-184 #2<br>Invention | II.<br>Jon-Cote<br>Safety Film<br>Chemtrend 614<br>B-1646-200A<br>Comparative | III.<br>B1641-184 #1<br>Invention | IV.<br>Jon-Cote<br>Safety Film<br>Chemtrend 639<br>B1646-200D<br>Comparative | V.<br>Comm'l Form.*<br>Polysiloxane<br>B1646-199E<br>Comparative | VI.<br>Witco<br>SACI 445W<br>Sulfonate<br>Emulsion<br>B1646-192B<br>Comparative |
|---|---|---|---|---|---|---|
| Days to Failure 5% Salt Fog | (1)24+ | 0.4-1.0 | 19 | 3 | (1)24+ | (2)14 |
| Film Integrity | Firm | Firm | Firm | Firm | Oily | Tacky |

(1)Continuing on test without failure.
(2)Two of three specimens failed at 9 days.

What is claimed is:

1. A method for protecting metallic workpieces from corrosion, comprising in combination the steps of:
   A. roughening the surfaces of said work pieces by sandblasting, oxynitriding, nitrocarburizing, nitrocarburizing plus oxidizing, phosphating or other metallurgical process to provide an expanded porous surface, and
   B. applying to said expanded surface a waterborne corrosion protective coating composition capable of application to metallic surfaces; said composition comprising in combination:
      1. colloidal metal-bearing organic/inorganic non-Newtonian complex having a total base number in the range of from about 80 to about 400 and comprising solid metal-containing colloidal particles, liquid dispersing agent and an organic molecule containing a hydrophobic portion and a polar substituent;
      2. a fatty acid having an acid value in the range of about 80 to about 250, and saponification number in the range of from about 80 to about 250, and having an iodine number in the range of about 110 to 160.
      3. alkali substituted organic amine.
      4. film-forming organic polymer.

2. A method according to claim 1 wherein said composition additionally comprises: alkali metal or alkaline earth metal sulfonate having a total base number in the range of about 0.05 to about 200.

3. A method according to claim 1 wherein the amine comprises a triethylamine and dimethylethanol amine.

4. A method according to claim 1 wherein the film forming organic polymer is selected from the group consisting of alkyd resins, polyolefin resins, acrylic resins, polyester resins, and polyurethanes.

5. A method according to claim 1 wherein the colloidal metal-bearing organic/inorganic non-Newtonian complex comprises (1) solid metal containing particles selected from the group consisting of alkali and alkaline earth metal salts, (2) a disperse medium selected from the group consisting of inert organic liquids and low molecular weight liquid polymers, and (3) an organic compound selected from the group consisting of alkali and alkaline earth metal salts of oil soluble organic acids.

6. A method according to claim 1 wherein the film-forming organic polymer comprises an acrylic film-forming polymer.

7. A method according to claim 1 wherein said composition consists essentially of water and dispersed within said water:
   a. A film-forming amount of a film-forming water dispersed organic polymer in the form of disperse particles, wherein said polymer is an acrylic copolymer derived from mixtures of two or more ethylenically unsaturated monomers or at least one ethylenically unsaturated monomer and at least one vinyl double bond unsaturated monomer; and b. a non-Newtonian colloidal disperse system comprising (1) solid metal-containing colloidal particles, (2) a liquid dispersing medium and (3) an organic compound, the molecules of which contain a hydrophobic portion and at least one polar substituent.

wherein said colloidal metal-bearing organic/inorganic non-Newtonian complex is characterized by having a pH of about 7 to 10 and is present in an amount sufficient to inhibit rust formation on the substrate to which said coating composition is applied.

8. A method according to claim 1 wherein the organic polymer is water-reducible or water-dispersible.

9. A method according to claim 1 wherein the colloidal complex is a sulfonate gel.

* * * * *